US005382130A

United States Patent [19]

Kempf

[11] Patent Number: 5,382,130

[45] Date of Patent: Jan. 17, 1995

[54] WHEELCHAIR LIFT WITH STOW LATCH MECHANISM AND IMPROVED BARRIER CYLINDER MOUNTING

[75] Inventor: Dale Kempf, Clovis, Calif.

[73] Assignee: Hogan Mfg., Inc., Escalon, Calif.

[21] Appl. No.: 859,563

[22] Filed: Mar. 26, 1992

Related U.S. Application Data

[63] Continuation-in-part of Ser. No. 701,143, May 15, 1991, Pat. No. 5,284,414.

[51] Int. Cl.$^6$ .................... B60D 1/46

[52] U.S. Cl. .................... 414/540; 414/921; 414/545; 14/71.3

[58] Field of Search .................... 414/921, 539, 540, 541, 414/542, 543, 680, 544, 545, 546, 556, 557, 558, 140.1, 430, 495; 187/9 R, 9 E, 8.52; 254/2 R, 2 C; 14/69.5, 71.3, 71.7, 71.1

[56] References Cited

U.S. PATENT DOCUMENTS

| | | | |
|---|---|---|---|
| 975,017 | 11/1910 | Capra . | |
| 1,979,788 | 11/1934 | Bacher | 254/93 |
| 2,456,805 | 12/1948 | Wohlforth . | |
| 3,282,451 | 11/1966 | Corley, Jr. | 414/558 |
| 3,528,574 | 9/1970 | Denner et al. | 414/558 |
| 3,800,915 | 4/1974 | Hinies | 414/545 |
| 3,918,596 | 11/1975 | Ward . | |
| 3,930,587 | 1/1976 | Bliss . | |
| 4,124,130 | 11/1978 | Rohrs et al. . | |
| 4,176,999 | 12/1979 | Thorley | 414/540 |
| 4,180,366 | 12/1979 | Roth et al. | 414/540 |
| 4,325,668 | 4/1982 | Julian et al. | 415/546 |
| 4,420,286 | 12/1983 | Hanson et al. | 414/539 |
| 4,441,850 | 4/1984 | Thorley | 414/545 |
| 4,442,921 | 4/1984 | Sherman | 187/8.52 |
| 4,466,771 | 8/1984 | Thorley et al. | 414/921 X |
| 4,529,351 | 7/1985 | Olins | 414/545 |
| 4,534,450 | 8/1985 | Savaria | 187/9 R |
| 4,579,500 | 4/1986 | Robinson | 414/545 |
| 4,664,584 | 5/1987 | Braun et al. | 414/541 |
| 4,711,613 | 12/1987 | Fretwell | 414/550 |
| 4,907,936 | 3/1990 | Bourdage | 414/545 |

*Primary Examiner*—Frank E. Werner
*Attorney, Agent, or Firm*—Christensen, O'Connor, Johnson & Kindness

[57] ABSTRACT

A step-type vehicle lift is provided with a linkage assembly (20) and horizontally oriented barrier cylinder (228) that enables movement of a barrier plate (102) between a retracted position and a barrier position while the step/platform assembly (24) is in the step position. A hinge (800) that connects the barrier plate (102) to an outer platform member (103) and is provided with at least one laterally extending projection (810). When the step/platform assembly (24) is in the step position, and the barrier plate (102) is moved to the retracted position, the projection (810) on the hinge (800) engages a slot (114) formed in the top of one of a pair of rails (108) that support the step/platform assembly (24), thereby latching the step/platform assembly (24) in the stowed position. When it is desired to extend the step/platform assembly (24) into the platform position, the barrier plate (102) is raised to the barrier position, thereby disengaging the projection (810) from the slot (114) in the rail (108).

The barrier cylinder (228) is mounted to support plates (600) attached to the bottom surface (30) of the outer platform member (103) such that the barrier cylinder (228) is in a substantially horizontal orientation at all times.

6 Claims, 9 Drawing Sheets

FIG. 11.
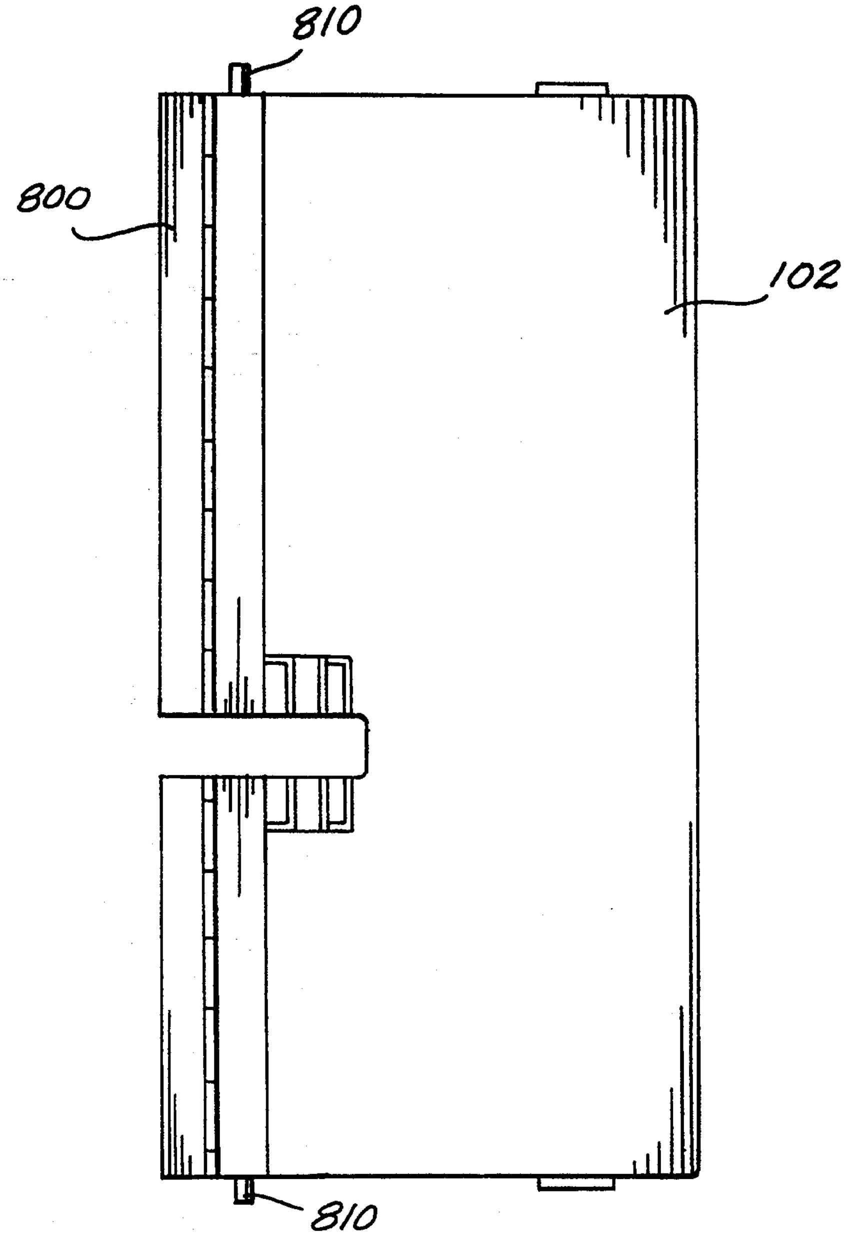
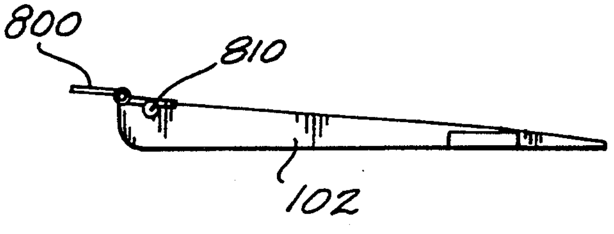
FIG. 12.

WHEELCHAIR LIFT WITH STOW LATCH MECHANISM AND IMPROVED BARRIER CYLINDER MOUNTING

CROSS-REFERENCES

This is a continuation-in-part of co-pending application Ser. No. 07/701,143, filed May 15, 1991, now Pat. No. 5284414.

FIELD OF THE INVENTION

The present invention relates to an improved lift for use in a transit vehicle, and more particularly, to a lift having an improved stow latch mechanism for securing a platform assembly of the lift in a stowed position and also having an improved barrier cylinder mounting.

BACKGROUND OF THE INVENTION

Wheelchair lifts of the type installed in the stairwell of transit vehicles, such as intracity buses, are well known. One type of wheelchair lift, commonly referred to as a "step lift," is illustrated in U.S. Pat. No. 4,466,771 to Thorley et at. (the "'771 patent"). The step lift is designed to be installed in the stairwell of a transit vehicle, and includes hinged panels that are movable between a step position and a platform position. In the step position, the hinged panels form steps for use by passengers to board and exit the vehicle. In the platform position, the hinged panels form a horizontal platform for use to raise and lower a wheelchair passenger between a vehicle floor-level position and a ground-level position. The hinged panels are attached to a carriage structure that may be driven upwards or downwards to raise or lower the platform.

Step lifts typically comprise a ramp/barrier plate which is pivotally mounted to the platform of the lift so as to be rotatable through an arc of about 180 degrees between a retracted position in which the ramp/barrier plate confronts and extends parallel to the platform and an extended position in which the ramp/barrier plate projects outwardly from the platform and is substantially coplanar with the platform. For ease of discussion, the ramp/barrier plate hereinafter will be referred to simply as the "barrier plate." The barrier plate provides a planar surface between the ground and the platform when the platform is in the lowered position, and acts as a vertically extending safety barrier (when in an intermediate position midway between the retracted and extended positions) for ensuring that a wheelchair does not roll off the platform when the platform is being moved between lower and upper positions.

Lifts of the type disclosed in the '771 patent typically include a linkage assembly for transmitting force from a hydraulic actuator to the barrier plate so as to cause the barrier plate to move between the retracted and extended positions. One portion of the linkage assembly is pivotally attached to the barrier plate, another portion of the linkage assembly is pivotally attached to the platform, and a third portion of the linkage assembly is attached to the hydraulic actuator. Generally, the linkage assembly is positioned in the center of the barrier plate and platform, i.e., midway between the left and fight sides of the barrier plate and platform as viewed from the roadside looking into the stairwell in which the lift is positioned.

Linkage assemblies of the type used in the '771 patent project above the surface of the barrier plate and platform more than is desired, e.g., as much as one inch. As a consequence of the central placement of the linkage assembly and its projecting configuration, a hump is formed which tends to interfere with a wheelchair occupant's use of the lift. Governmental regulations regarding the design of wheelchair lifts now prohibit projections that extend above the upper surface of the barrier plate and platform more than 0.25 inch. Clearly, linkage assemblies of lifts of the type disclosed in the '771 patent do not comply with this regulation.

Furthermore, the design of linkage assemblies of the type used on the lift of the '771 patent typically include undesirably large openings or gaps between the various elements making up the linkage assembly and between the linkage assembly and the apertures in the barrier plate and platform in which the linkage assembly is received. These gaps open out to the upper surfaces of the platform and the barrier plate and are sufficiently large that the heel of a high-heeled shoe, an end of a cane, or a child's foot could possibly become lodged within a gap between linkage elements. To avoid such an occurrence, flexible covers have been used to block gaps between elements of linkage assemblies. Such covers add to the cost of the linkage assembly, can adversely affect the operation of the linkage assembly, and tend to require frequent maintenance. Absent the use of such covers, the gaps between elements of known linkage assemblies do not comply with current governmental regulations which permit gaps up to only 0.625 inch wide.

The construction of linkage assemblies of the type used in the '771 lift is such that the various components thereof are formed by various machining operations. These operations tend to be relatively time consuming, and hence expensive. Consequently, the total cost of a linkage assembly of the type disclosed in the '771 patent is typically more expensive than is desired.

Linkage assemblies of the type disclosed in the '771 patent are generally designed so that access to the attachment point of the end of the linkage assembly coupled to the barrier plate is via the bottom surface of the barrier plate. Because such bottom surface is typically covered with a tread that covers the attachment point, and the process for removing and reinstalling the tread is relatively time consuming, removal of the linkage assembly for maintenance or replacement tends to be more difficult and time consuming than is desired.

The design of linkage assemblies of the type disclosed in the '771 patent is such that the barrier plate is driven downwardly toward the extended position with a relatively large force. This force is sufficiently great that if a person's feet are positioned underneath the barrier plate, the possibility exists that the person's feet could be crushed. To avoid the possibility of such an accident, a relief valve for limiting the pressure of the hydraulic fluid supplied to the actuator is provided. Such a relief valve adds to the cost of the lift.

Yet another problem with linkage assemblies of the type disclosed in the '771 patent is that the various components thereof require frequent lubrication, thereby adding to the cost of maintaining the linkage assembly. Furthermore, the design of the components of such known linkage assemblies is such that the components tend to corrode, thereby adversely affecting the free operation of the portions of the lift coupled to the linkage assembly and increasing the stresses applied to various components of the linkage assembly and the lift.

Furthermore, in the lift disclosed in the '771 patent, the actuator for movement of the barrier plate comprises a hydraulic cylinder mounted to the bottom of the curbside riser panel such that when the hinged panels are in the step position, the hydraulic cylinder for the barrier plate (hereinafter, "barrier cylinder") is in a substantially vertical position, as shown in FIG. 2 of the '771 patent. As the hinged panels move from the step position to the platform position, the barrier cylinder and the linkage assembly cause the barrier plate to move from the retracted position to the barrier position. If movement of the hinged panels or the barrier plate is hindered, for example, due to binding, or to striking an object, bending forces are applied to the barrier cylinder rod. The cylinder rod is designed only for the application of push/pull forces along the axis of the rod. If bending forces are applied to the cylinder rod, the barrier cylinder may be damaged.

It is also desirable for the step/platform assembly of a lift of the type disclosed in the '771 patent to be latched in the stowed position so that horizontal movement of the step/platform assembly is prevented in the event of failure of the platform extension cylinders. It is known to provide a step lift with a platform-mounted catch that engages a latch mounted at the rear of the lift. When the step/platform assembly is moved to the stowed position, the catch engages the latch such that the step/platform assembly is secured. In order to release the latch, it is required to actuate a cylinder to disengage the catch. This type of stow latch arrangement has a relatively complex construction and requires the provision of a dedicated actuating cylinder for the catch.

Consequently, a need exists for a linkage assembly for a step lift of the type disclosed in the '771 patent that does not project more than 0.25 inch above the upper surfaces of the platform and barrier plate and that does not include gaps of more than 0.625 inch. A need also exists for such a linkage assembly that can be serviced without removing the tread on the bottom surface of the barrier plate and that does not require periodic lubrication. A need further exists for a linkage assembly that is designed to drive the barrier plate downwardly toward the extended position with a force such that a person's feet inadvertently positioned in the path of travel of the barrier plate will not be crushed. A need additionally exists for a linkage assembly that is made from pans which can be fabricated quickly and inexpensively, preferably without the need for extensive machining operations. Moreover, a need exists for a barrier cylinder configuration that does not potentially subject the cylinder rod to bending forces. Furthermore, a latch mechanism for securing the step/platform assembly in the stowed position that has simple construction and does not require additional actuators or linkages is desirable.

SUMMARY OF THE INVENTION

The present invention provides a linkage assembly designed for use with a wheelchair lift comprising a platform and a barrier plate pivotally attached to an outer edge of the platform so as to be rotatable through at least a 180 degree arc between retracted and extended positions. In the retracted position the upper surface of the barrier plate confronts and extends substantially parallel to the top surface of the platform and in the extended position the barrier plate extends forwardly of the platform and its upper surface is substantially coplanar with the top surface of the platform. The linkage assembly is designed to transmit force from a linear actuator to the barrier plate so as to cause the latter to move between the retracted and extended positions.

The linkage assembly comprises a plurality of flat linkage members that are designed so as not to project more than about 0.25 inch above the upper surface of the barrier plate and the top surface of the platform. The linkage assembly is further designed to provide a structure within the apertures in the barrier plate and platform through which the linkage assembly extends when the barrier plate is in the extended position. This structure comprises an upper surface that is substantially coplanar with the upper surface of the barrier plate and the top surface of the platform. Also, the structure is designed to fill in the apertures such that no gaps exist having a width greater than 0.625 inch.

The linkage assembly is designed to transmit the actuation force provided by the linear actuator to the barrier plate such that the linkage assembly applies a significantly greater actuation force to the barrier plate when the latter extends perpendicular to the top surface of the platform than when the barrier plate is in the retracted or extended positions. As a consequence of this feature, the barrier plate is driven downwardly toward the extended position with a force which is insufficient to crush a person's feet positioned in the path of travel of the barrier plate. As an additional consequence of this feature, the force which must be applied to the barrier plate to move the latter from the perpendicular position toward the extended position is sufficient to strongly resist the force applied by a wheelchair rolling against the barrier plate.

The present invention also provides a barrier cylinder mounting that does not subject the cylinder rod to potential bending forces. In the lift in accordance with the present invention, the barrier cylinder is attached to support plates mounted to the bottom surface of the outer platform member, rather than to the curbside riser panel, so that the barrier cylinder maintains a substantially horizontal orientation, and them is no potential for damage to the barrier cylinder as the result of bending forces applied to the cylinder rod.

The present invention further provides a step/platform assembly latch mechanism having a simple construction. The latch mechanism does not require the use of a dedicated actuating cylinder. Since the lift in accordance with the present invention is provided with a barrier cylinder and linkage assembly that enable movement of the barrier plate between a retracted position and a barrier position while the hinged panels are in the step position, the actuation of the barrier plate can be used to actuate the platform assembly latch mechanism. The hinge that attaches the barrier plate to the outer platform member is provided with a laterally extending projection on at least one side of the hinge. When the barrier plate is moved to the retracted position, the laterally extending projection engages a slot provided in one of the lift slide rails. When the projection is engaged in the slot, the step/platform assembly is prevented from moving horizontally. Unlatching is accomplished simply by actuating the barrier cylinder to raise the barrier plate. By making lowering of the barrier plate to the retracted position the last step of a lift stowing operation, and raising of the barrier plate to the barrier position the first step of a lift deployment operation, the latch mechanism for the step/platform assembly may easily be latched and unlatched, since latching and unlatching is accomplished simply through the normal operation of the barrier plate.

BRIEF DESCRIPTION OF THE DRAWINGS

FIG. 11 is a top view of the barrier plate having the hinge attached thereto, the hinge having a laterally extending projection at either side of the hinge; and FIG. 12 is a side view of the barrier plate and hinge shown in FIG. 11.

DETAILED DESCRIPTION OF THE PREFERRED EMBODIMENT

Figure 1:
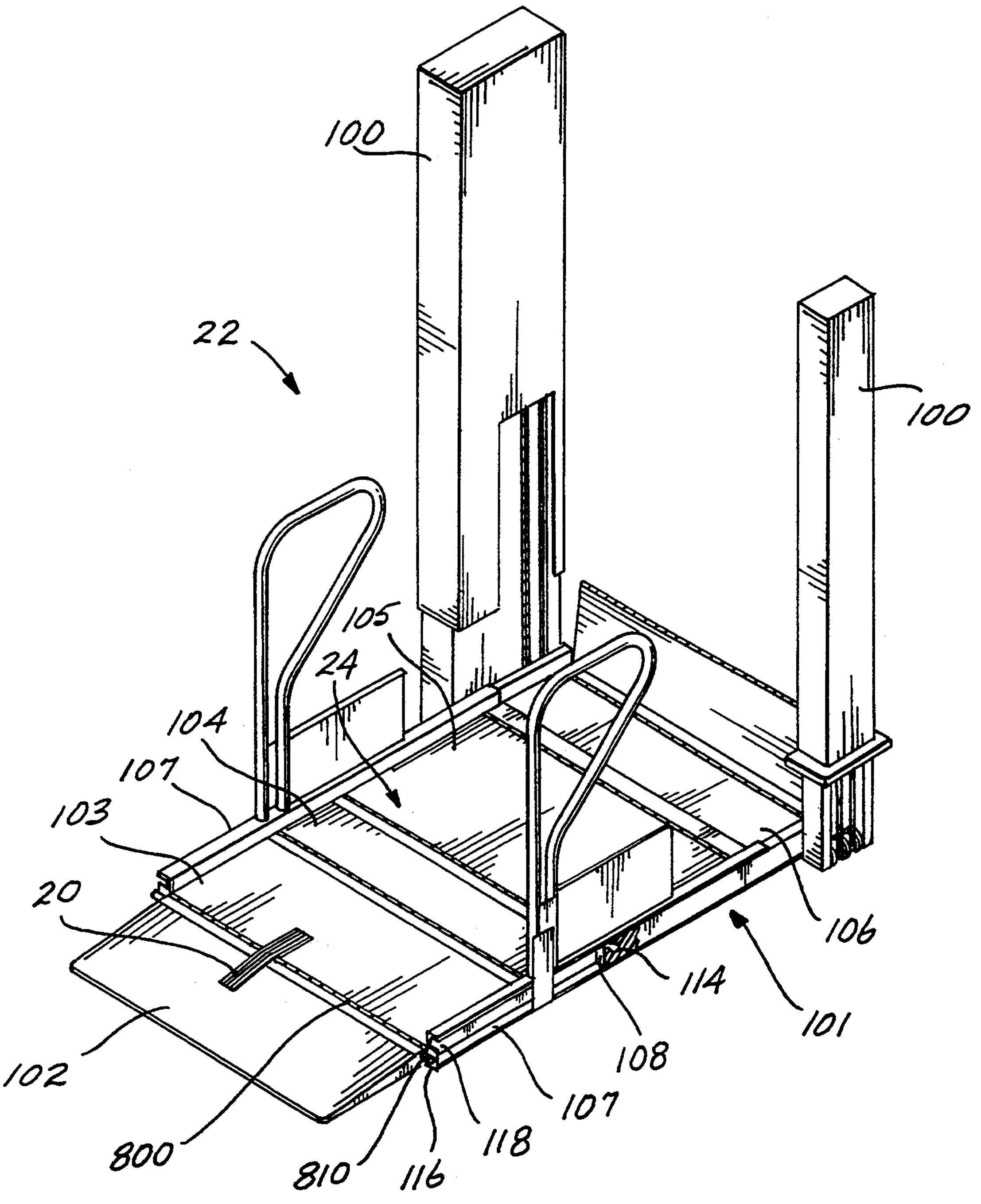
FIG. 1 is a perspective view of a step lift incorporating the present invention, with the lift being shown in the platform position.
Figure 2:
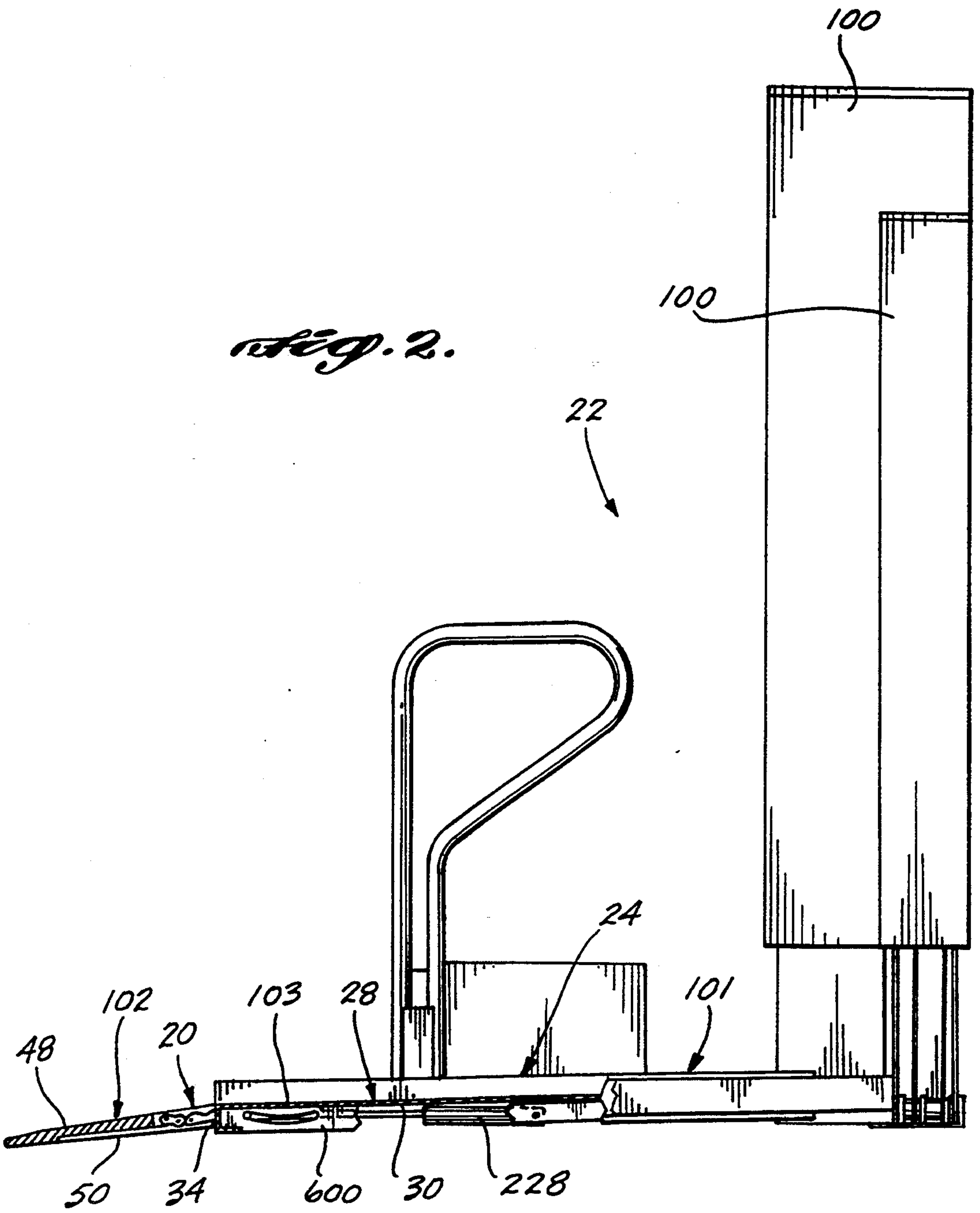
FIG. 2 is a side view of the step lift shown in FIG. 1, with a portion of the lift being illustrated in cross-section to reveal the barrier cylinder and linkage assembly.
Figure 3:
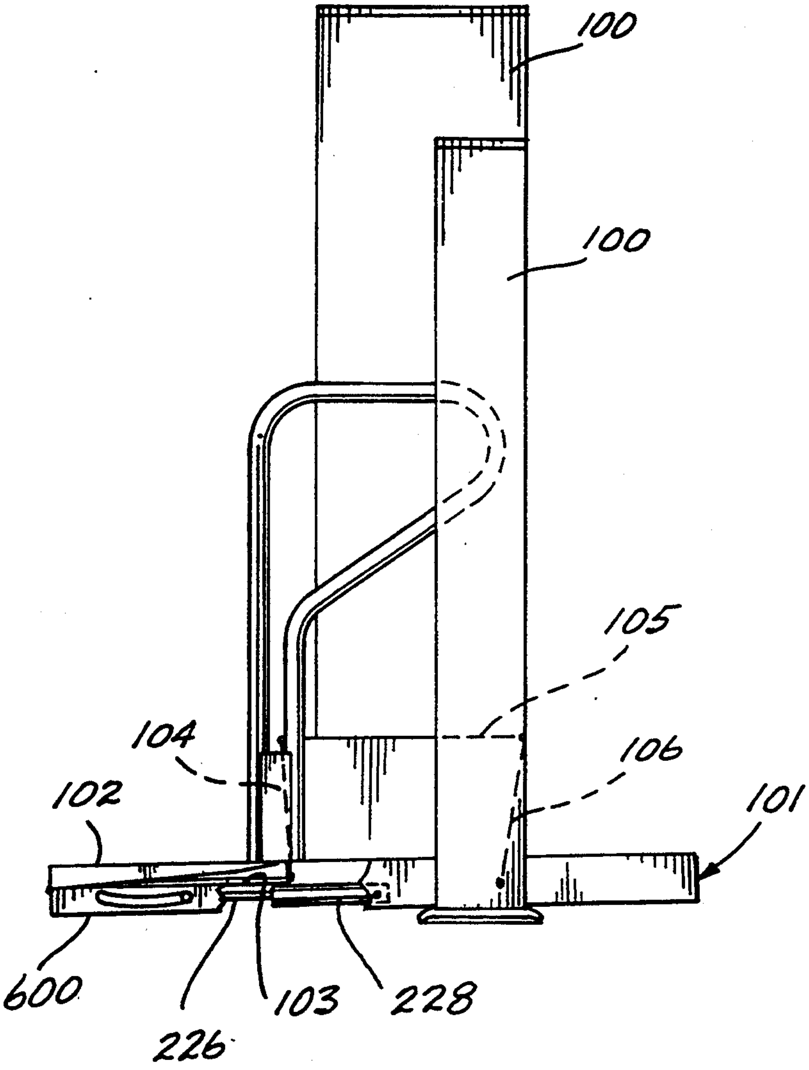
FIG. 3 is a side view of the step lift shown in FIG. 1, with the lift in the step position, and part of the lift being cut-away to reveal the horizontally mounted barrier cylinder.
Figure 4:
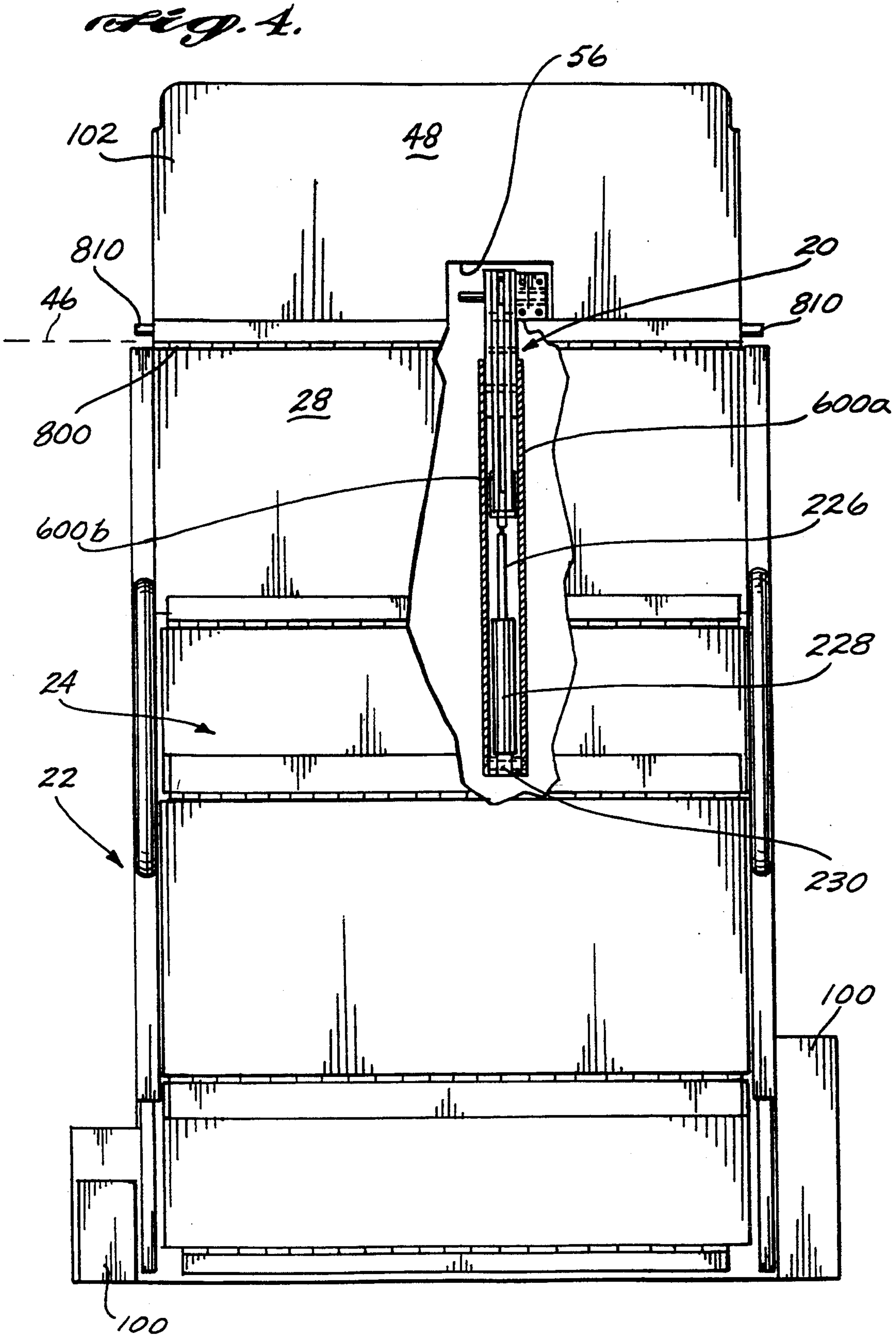
FIG. 4 is a top view of the step lift illustrated in FIGS. 1 and 2, with a portion of the platform being cut-away to illustrate the linkage assembly and barrier cylinder.

Referring to FIGS. 1, 2 and 4, the present invention provides a linkage assembly 20 designed for use in a step lift 22 of the type illustrated in the '771 patent. The structure of the lift 10 is described generally with reference to FIGS. 1, 2, and 3. The lift 22 includes a pair of towers 100. A carriage assembly 101 is configured to travel up and down between the towers 100. Attached to the carriage assembly 101, is a step/platform assembly 24 that serves as the steps of the entryway of the vehicle when the step/platform assembly 24 is in a step position, and as a platform for transporting a wheelchair passenger when the step/platform assembly 24 is in a platform position. The step/platform assembly 24 comprises a plurality of hinged plates that can be folded into steps, and alternatively, extended into a platform. More specifically, the step/platform assembly 24 includes a barrier plate 102, a base plate 103, a riser plate 104, a step plate 105, and a back plate 106.

The carriage assembly 101 includes a pair of slides 107 that ride on rails 108. The slides 107 may be moved between an extended position (FIG. 1) and a stowed position (FIG. 3). The barrier plate 102, base plate 103 (alternatively, "outer platform member"), riser plate 104, step plate 105, and back plate 106 are pivotably attached to one another and to carriage assembly 101 so as to permit the plates 102–106 to be moved between a step position (also referred to as the "stowed position"), illustrated in FIG. 3, and a platform position (also referred to as the "extended position"), illustrated in FIG. 1. In the step position, one surface of barrier plate 102 forms the first step of the steps of the vehicle, and step plate 105 forms the second step. In the platform position, the barrier plate 102, base plate 103, riser plate 104, step plate 105, and back plate 106 form a substantially planar platform. The outer platform member 103 has a planar upper surface 28 and a bottom surface 30, and includes a rectangular aperture 32 extending therethrough which begins adjacent outer edge 34 of the outer platform member 103 and extends away from the front edge a predetermined distance.

Figure 7:
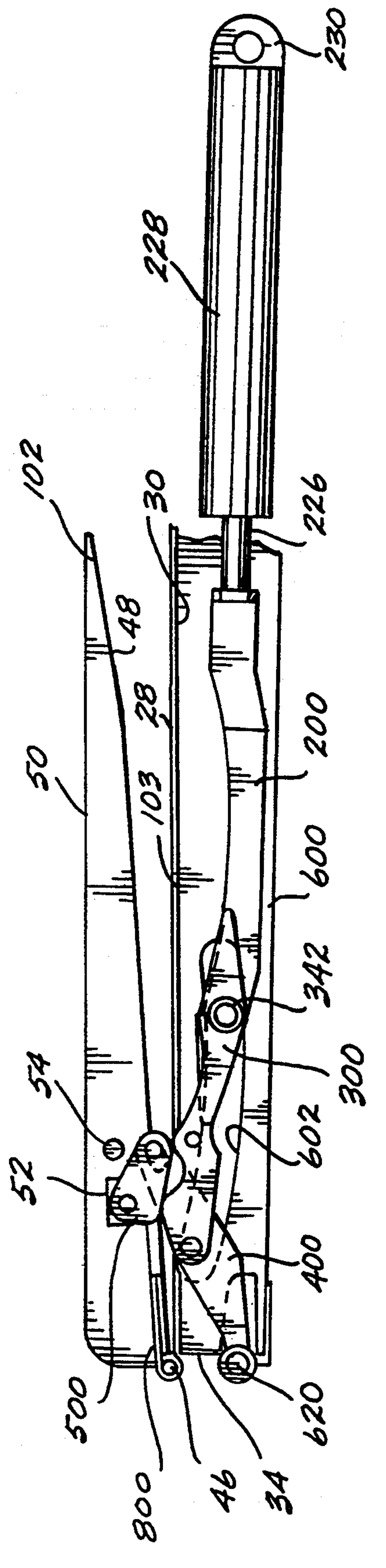
FIG. 7 is a cross-sectional view of the barrier plate and platform, illustrating in side elevation the linkage assembly and the barrier cylinder, with the barrier plate being shown in the fully retracted position in which the top surface of the barrier plate confronts and extends substantially parallel with the upper surface of the platform.
Figure 8:
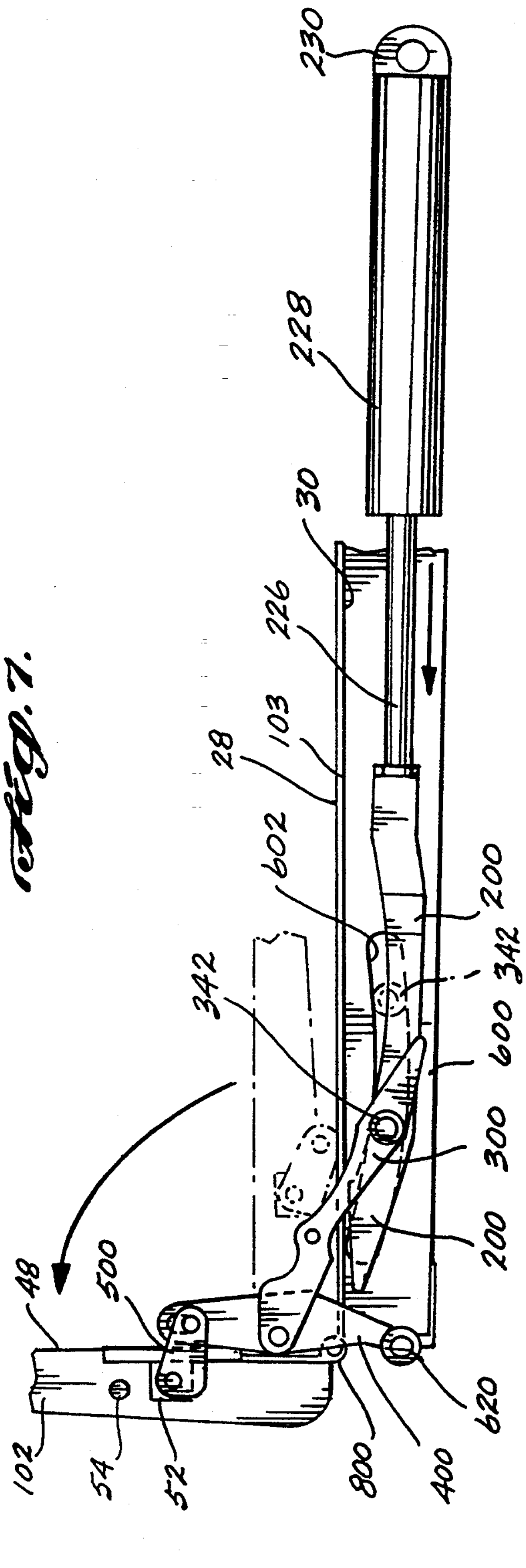
FIG. 8 is similar to FIG. 7, except that the barrier plate is shown in the barrier position in which the top surface of the barrier plate extends substantially perpendicular to the upper surface of the platform.
Figure 9:
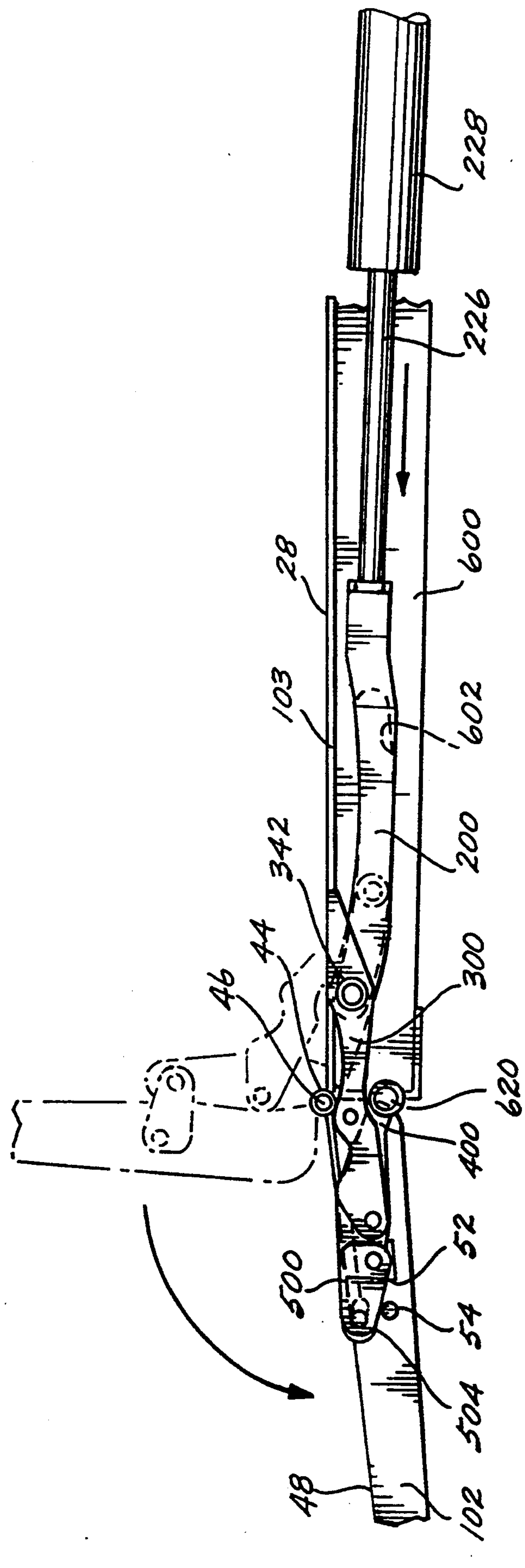
FIG. 9 is similar to FIG. 8, except that the barrier plate is shown in the fully extended position in which the barrier plate projects from the platform and the top surface of the barrier plate extends substantially parallel to the upper surface of the platform.
Figure 10:
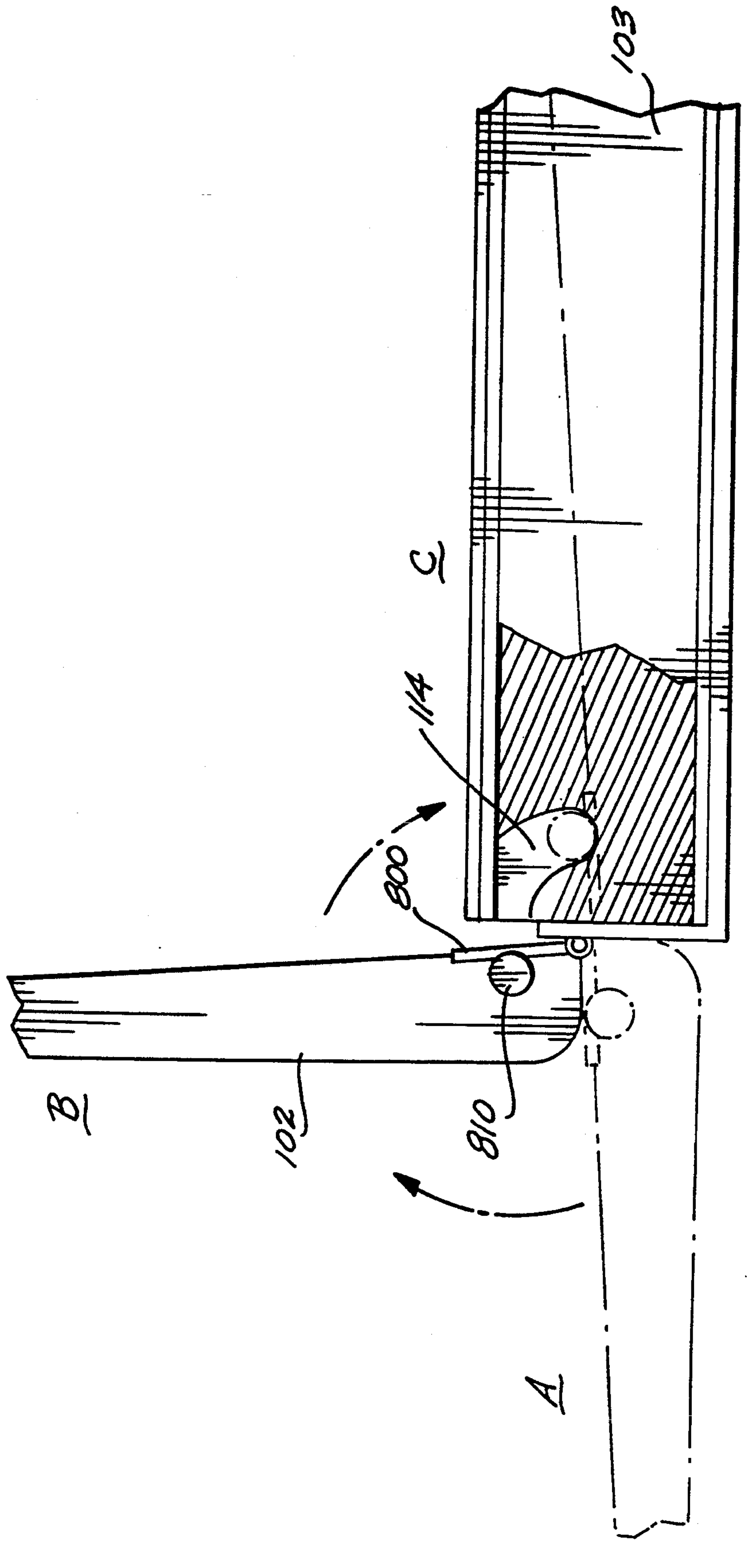
FIG. 10 is a partially cut-away side view of the stow latch mechanism of the present invention, in which the phantom view designated position "A" shows the position of the hinge and associated laterally extending projection when the barrier plate is in the extended position, the solid view designated position "B" shows the hinge and associated laterally extending projection when the barrier plate is in the barrier position, and the phantom view designated position "C" shows the hinge and associated laterally extending projection when the barrier plate is in the retracted position.

Referring to FIGS. 7–9, the barrier plate 102 is pivotally attached to the outer edge 34 of outer platform member 103 via hinge 800 so as to be rotatable about a pivot axis 46 which preferably extends along the plane of the upper surface of outer platform member 103. Barrier plate 102 comprises a planar top surface 48, a bottom surface 50, and a pocket 52 (FIG. 7) which opens up to top surface 48. Pocket 52 is aligned with aperture 32 in platform member 103 and is positioned adjacent hinge 800. Barrier plate 102 includes two studs, one of which is identified at 54 in FIGS. 7–9, positioned adjacent pocket 52. Studs 54, as described hereinafter, lie in the path of travel of drag links 500. Barrier plate 102 also includes an aperture 56 (FIG. 4) adjacent the end of the barrier plate attached to hinge 800 and is aligned with aperture 32 in outer platform member 103.

As a consequence of the pivotal attachment of barrier plate 102 to platform member 103, the barrier plate 102 may be moved from a retracted position, as illustrated in FIG. 7, through a barrier position, as illustrated in FIG. 8, and to an extended position, as illustrated in FIG. 9. In the retracted position, top surface 48 confronts and extends substantially parallel to upper surface 28. In the barrier position, top surface 48 extends perpendicular to upper surface 28. In the extended position, barrier plate 102 projects forwardly of platform member 103 such that the top surface 48 of the barrier plate is substantially coplanar with upper surface 28 of platform member 103. Thus, barrier plate 102 may be rotated about pivot axis 46 through an arc of approximately 180 degrees.

Figures 5, 6:
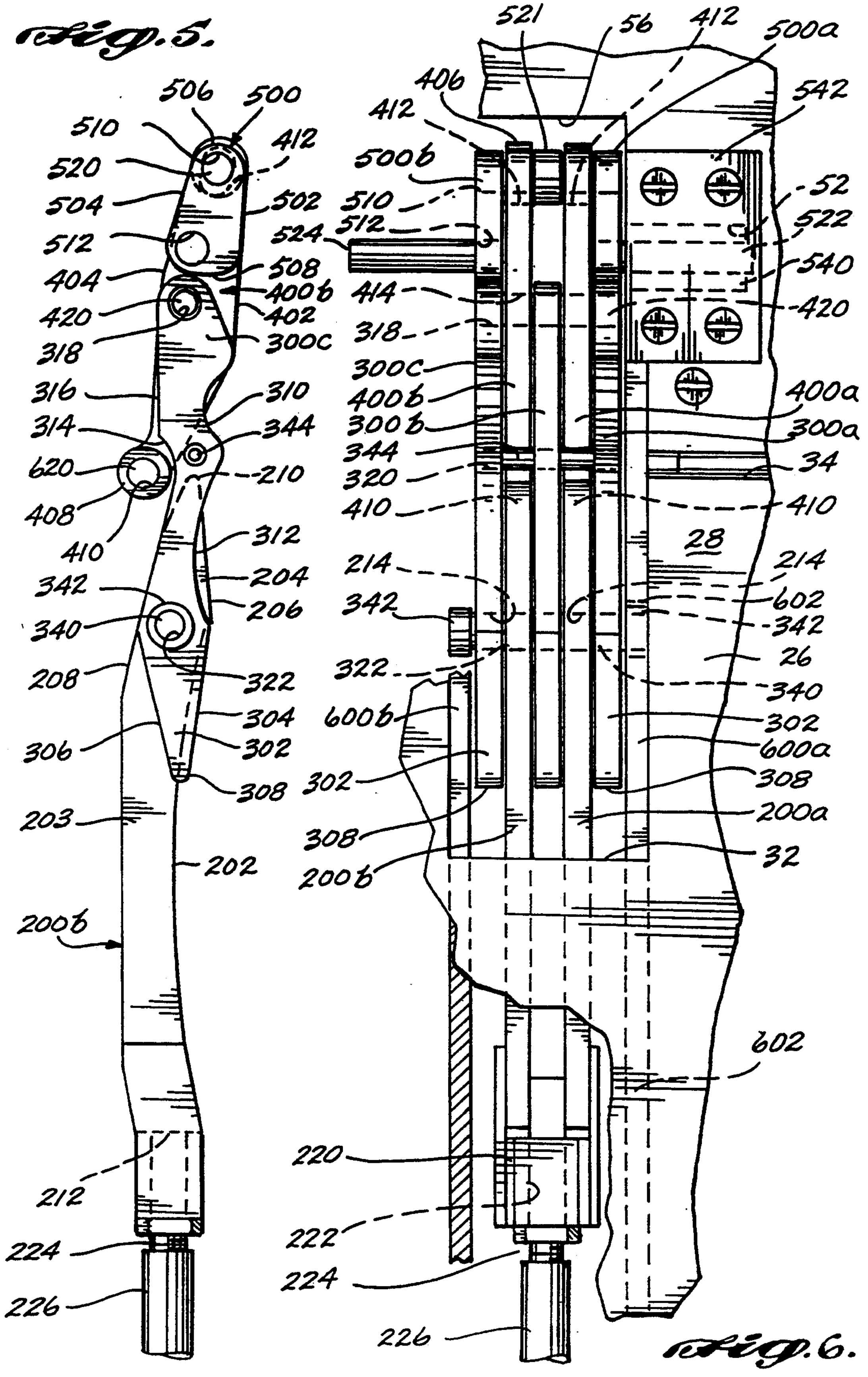
FIG. 5 is a side view of the linkage assembly.
FIG. 6 is a top view of the linkage assembly illustrated in FIG. 5.

Referring to FIGS. 5 and 6, linkage assembly 20 comprises elongate clevis links 200*a* and 200*b*. The latter have an identical configuration and are preferably made from flat plates of steel having a thickness of about 0.31 inch. Clevis links 200 each have a gradually curving concave upper surface 202, a flat bottom surface 203 and a triangularly shaped outer portion 204 having a flat upper surface 206 and a gradually curving bottom surface 208 which join at an outer end 210. Surfaces 206 and 208 extend transversely relative to one another such that an angle of about 15 degrees is included between the surfaces. Clevis links 200*a* and 200*b* each terminate at an inner edge 212 which extends substantially perpendicular to the long axes of the links. Clevis links 200*a* and 200*b* each include a bore 214 (FIG. 6) extending therethrough, positioned beneath the junction of surfaces 206 and 202 and approximately centered within the width of the clevis link.

The following discussion sets forth dimensions for the preferred embodiment; however, it should be understood that other dimensions may be used. In the preferred embodiment, clevis links 200*a* and 200*b* each have a length of 7.84 inches, as measured between outer end 210 and rear edge 212 along an axis extending parallel to bottom surface 203. The center of bore 214 is spaced 6.00 inches from rear edge 212, as measured along an axis extending parallel to bottom surface 203, and upper surface 206 has a length of about 1.75 inches.

The portions of clevis links 200*a* and 200*b* adjacent inner edges 212 are attached to a U-shaped bracket 220 having a threaded bore 222 therein for receiving threaded end 224 of rod 226 of barrier actuator 228 (hereinafter, "barrier cylinder 228"). The barrier cylinder 228 is positioned underneath platform assembly 24, and an inboard end 230 of barrier cylinder 228 is pivotally attached to the platform assembly, as illustrated in FIG. 4. Bracket 220 is designed to support clevis links 200*a* and 200*b* in spaced relation such that a predetermined space is provided between the links. In the preferred embodiment, hydraulic fluid is provided to burner cylinder 228 at about 1200 psi, piston rod 226 has a diameter of 0.625 inch and burner cylinder 228 has an internal diameter of 1.00 inch.

Linkage assembly 20 also comprises connecting links 300*a*, 300*b*, and 300*c*. The latter are identical in configuration and are preferably made from steel plate having a thickness of about 0.31 inch. Each of the connecting links 300 includes a triangularly shaped inner portion 302 having a fiat upper surface 304 and a flat bottom surface 306, which surfaces join at inner end 308 and include an angle of about 15 degrees. Each connecting link 300 includes a first concave depression 310 in the upper surface thereof and a second concave depression 312 in the upper surface inwardly of the first depression (i.e., to the fight of the first depression, as viewed in FIG. 5). Each of the connecting links 300 also include a concave depression 314 in the bottom surface thereof. The outermost portion 316 of the bottom surface of connecting links 300 is fiat. Furthermore, as shown in FIG. 5, each of the links 300 include a bore 318 extending therethrough adjacent the outer end thereof, a bore 320 extending through an intermediate portion thereof and positioned between depressions 310 and 312, and a third bore 322 positioned at the junction of triangular inner portion 302 with the remainder of the connecting link.

In the preferred embodiment, connecting links 300 have a length of 6.03 inches, as measured between the outermost portion and the innermost portion of the connecting links. Also, the center of bore 318 is spaced 3.87 inches from the center of bore 322, and the center of bore 318 is spaced 1.78 inches from the center of bore 320. Also, as measured along axes extending perpendicular to flat bottom surface portion 316, bore 318 is positioned 0.125 inches below bore 320, and bore 318 is positioned 0.187 inches above bore 322.

The outer portion 204 of clevis link 200*a* is positioned between inner portions 302 of connecting links 300*a* and 300*b*, and the outer portion 204 of clevis link 200*b* is positioned between inner portions 302 of connecting links 300*b* and 300*c*. The clevis links 200 are pivotally attached to the connecting links 250 via a pin 340 (FIGS. 5 and 6) extending through bores 214 in the clevis links and bores 322 in the connecting links. Pin 340 is sized to project outwardly of the outer side surfaces of connecting links 300*a* and 300*c*, and wheels 342 are attached to the projecting ends of the pin so as to rotate with the pin and prevent the clevis links and connecting links from moving laterally away from one another. Connecting links 300 are also held together by a pin 344 received in bores 320 with an interference fit.

Linkage assembly 20 also comprises control levers 400*a* and 400*b*. The latter have an identical configuration and are preferably made from steel plate having a thickness of about 0.31 inch. Control levers 400*a* and 400*b* each comprise a flat upper surface 402, a flat bottom surface 404 which extends transversely to the upper surface such that an angle of about 11 degrees is included between the surfaces. Surfaces 402 and 404 join one another at curved outer end 406. Control levers 400*a* and 400*b* taper to small inner portion 408 having a bore 410 extending therethrough. Each of the control levers 400*a* and 400*b* includes an oval slot 412 extending through the outer portion thereof, and a bore 414 extending through a central portion thereof. Slot 412 is aligned so that its long axis extends parallel to upper surface 402.

In the preferred embodiment of linkage assembly 20, control levers 400 have a length of 4.36 inches, as measured between outer end 406 and the innermost surface of inner portion 408 along an axis extending parallel to upper surface 402. The center of oval slot 412 is spaced 3.70 inches from the center of bore 410, and the center of bore 414 is spaced 2.08 inches from the center of bore 410. The center of slot 412 is positioned 0.306 inches above the center of bore 414, and the center of bore 410 is positioned 0.389 inches below the center of bore 414, as measured along axes extending perpendicular to upper surface 402.

The inner half of control lever 400*a* is positioned between the outer portions of connecting links 300*a* and 300*b*, and the inner portion of control lever 400*b* is positioned between the outer portions of connecting links 300*b* and 300*c*. Control levers 400 are pivotally attached to connecting links 300 via a pin 420 which is received in bores 318 in connecting links 300 with a sliding fit and is received in bores 414 in control levers 400 with an interference fit.

Linkage assembly 20 further comprises drag links 500*a* and 500*b*. The latter have an identical configuration and are preferably made from steel plate having a thickness of about 0.31 inch. Drag links 500*a* and 500*b* each include a flat upper surface 502, a flat bottom surface 504, which surfaces join at curved outer end 506 and include an angle of about 15 degrees, and a flat inner surface 508. Bore 510 extends through each drag link adjacent the front end 506 thereof, and bore 512 extends through each drag link adjacent the inner end thereof.

In the preferred embodiment, drag links 500 have a length of 1.54 inches, as measured between front end 506 and rear surface 508 along an axis extending parallel to upper surface 502. The centers of bores 510 and 512 are spaced 1.00 inch apart.

The outermost portions of control levers 400 are received between drag links 500, with drag link **500*a* being positioned next to control lever 400*a* and drag link 500*b* being positioned next to control lever 400*b*. Drag links 500 are pivotally attached to control levers 400 via pin 520 which is received in bores 510 in the drag links with an interference fit and which is received in slots 412 in control levers 400 with a free sliding fit. A spacer 521 is provided between control levers 400*a* and 400*b*. Spacer 521 (FIG. 6) is rotatably mounted on pin 520**.

Linkage assembly 20 includes elongate pivot shafts 522 and 524. One end of shaft 522 is received in bore 512 in drag link **500*a* with an interference fit and projects outwardly from the drag link a predetermined distance, e.g., 2 inches, and one end of shaft 524 is received in bore 512 in drag link 500*b*** with an interference fit and projects outwardly from the drag link a similar predetermined distance.

Linkage assembly 20 additionally comprises a pair of bushing blocks, one of which is identified at 540 in FIG. 6, for receiving shafts 522 and 524 such that the shafts are free to rotate about their axes within the bushing blocks. Bushing blocks 540 are received in pocket 52 in barrier plate 120 such that the axes of rotation of shafts 522 and 524 are coaxial and extend parallel to the rotational axis of hinge 800. By this attachment of shafts 522 and 524 to barrier plate 102, drag links **500*a* and 500*b* are pivotally mounted to barrier plate 102. Bushing blocks 540 are held in place in pocket 52 by a plate 542**.

Referring to FIGS. 2, 3, 6, and 7, linkage assembly 20 also includes identical support plates **600*a* and 600*b*. The latter are attached to bottom surface 30 of outer platform member 103 such that plate 600*a* is positioned adjacent the outer sides of clevis link 200*a* and connecting link 300*a*, and plate 600*b* is positioned adjacent the outer sides of clevis link 200*b* and connecting link 300*c*. Plates 600*a* and 600*b* begin at front edge 34 and extend inwardly from the front edge a suitable distance, e.g., about 2 feet. Each of the plates 600*a* and 600*b* includes an inclined, arcuate slot 602 extending therethrough adjacent the front portion of the plate. The width of slots 602 is slightly greater than the outside diameter of wheels 342 so that the wheels may roll freely within the slots, as discussed hereinafter. The outer end (i.e., the left end, as viewed in FIG. 7) of each slot 602 is positioned adjacent the upper edge of the support plate 600 and the inner end of the slot is approximately centered within the support plate. In the preferred embodiment, slots 602** have a length of about 5.5 inches and extend along an arc having a radius of about 12 inches.

In connection with the following discussion of the manner in which linkage assembly 20 is attached to lift 22 and the manner in which linkage assembly 20 operates, reference should be made to FIGS. 4–9. Because shafts 522 and 524 are pivotally attached to barrier plate 102, as discussed above, drag links 500, spacer 521, the majority of control levers 400, and the outer portions of connecting links 300 are received in aperture 56 in barrier plate 102 when the latter is in the extended position illustrated in FIGS. 5, 6, and 9.

As best seen in FIGS. 7–9, small inner portion 408 of control levers 400 is pivotally attached to platform member 103 adjacent the outer edge 34 thereof via a pin 620 (FIGS. 7–9). Pin 620 is sized to pivot freely within bores 410 in inner portions 408 and is non-rotatably affixed to platform member 103 such that the longitudinal axis of the pin extends parallel to the axis of rotation of hinge 800. Pin 620 is preferably attached to platform member 103 below hinge 800. In the preferred embodiment of the present invention, the longitudinal axis of pin 620 is positioned 1.125 inches below the pivot axis 46 of hinge 800 and is vertically aligned with the pivot axis of hinge 800.

When barrier plate 102 is in the fully extended position (FIG. 9), the majority of connecting links 300 and the outer portions of clevis links 200 are positioned in aperture 32 in platform member 103. Also in this position, wheels 342 are received in the outermost portions of slots 602 in support plates 600. The inner portions of clevis links 200 extend underneath platform member 103 adjacent its bottom surface 30, and are attached via U-shaped bracket 220 to rod 266 of barrier cylinder 228.

Assuming barrier plate 102 is initially in the retracted position illustrated in FIG. 7, the barrier plate is caused to move toward the extended position by causing barrier cylinder 228 to operate such that its piston rod 226 is extended. As piston rod 226 moves toward outer edge 34, it drives clevis links 200 toward the outer edge. This outward movement of the clevis links is transmitted via pin 340 to connecting links 300, thereby causing the latter to move outwardly and upwardly. Wheels 342 roll within slots 602 during this movement of the clevis links and connecting links.

The outward and upward movement of connecting links 300 is transmitted to control levers 400 via pin 420 causing the control levers to initially move toward a vertically extending position, as illustrated in FIG. 8. This movement of control levers 400 is transmitted via pin 520 to drag links 500 which, in turn, cause barrier plate 102 to move upwardly from the retracted position illustrated in FIG. 7 toward the barrier position illustrated in FIG. 8.

Connecting links 300 and control levers 400 together provide a moment arm which becomes increasingly large as the barrier plate 102 approaches the vertically extending position it assumes in the barrier position. Thus, the linkage assembly 20 transmits a smaller portion of the force provided by barrier cylinder 228 to barrier plate 102 when the barrier plate is in the retracted position than when the barrier plate is in the barrier position. An important aspect of this change in the mechanical advantage provided by linkage assembly 20 is that when barrier plate 102 is in the barrier position, the position to which it is moved when a wheelchair and occupant are being raised and lowered, a relatively large force is required to drive the barrier plate 102 outwardly toward the extended position. As a consequence, linkage assembly 20 and barrier cylinder 228 strongly resist the tendency of barrier plate 102 to pivot outwardly when a heavily loaded wheelchair rolls against barrier plate 102.

Additional extension of piston rod 226 causes the elements of linkage assembly 20 to drive barrier plate 102 toward the extended position illustrated in FIG. 5. As barrier plate 102 approaches the extended position, the axes of pin 520, pin 420, and pin 340 begin to nearly line up, i.e., lie on a common plane. In fact, during the last few degrees of downward travel of barrier plate 102, the axis of pin 520 drops below the plane on which pins 340 and 420 lie, i.e., pin 520 moves to an "over center" position. As a consequence of this alignment of pins 340, 420 and 520, the length of the moment arm provided by connecting links 300 and control levers 400 is reduced significantly such that the force applied to barrier plate 102 as it approaches the extended position is much less than the force applied to the barrier plate when it is in the barrier position.

With the preferred embodiment, the magnitude of the force provided by linkage assembly 20 to barrier plate 102 when the latter is in the barrier position (i.e., when barrier plate 102 is at about the halfway point in its travel through the 180 degree arc) is at least four times the magnitude of the force provided by the linkage assembly to the barrier plate during its last few degrees of travel toward or away from the extended position. Similarly, the magnitude of the force the linkage assembly applies to the barrier plate as the latter approaches the retracted position is about one quarter or less the magnitude of the force the linkage assembly applies to the barrier plate when the latter is in the barrier position.

As a consequence of this design of the preferred embodiment of linkage assembly 20, barrier plate 102 is urged downwardly during the last few inches of travel toward the extended position such that the outermost edge of the barrier plate provides a downwardly extending force of only about 40 pounds. Thus, a person's feet inadvertently positioned in the path of travel of barrier plate 102 will not be crushed by the barrier plate.

An important advantage of the design of linkage assembly 20 responsible for barrier plate 102 being urged to the extended position with minimal force is that extra controls in the hydraulic circuitry associated with barrier cylinder 228 are not required. As noted above, known lifts utilize pressure limiting valves in conjunction with the actuator for limiting the pressure of hydraulic fluid provided to the actuator, thereby limiting the actuation force the actuator can generate.

During the last few degrees of downward travel of barrier plate 102, bottom surface 504 of drag links 500 will engage studs 54 which projects outwardly so as to lie in the path of travel of the drag links. As a consequence of this engagement, drag links 500 urge studs 54, and barrier plate 102 attached thereto, downwardly to the fully extended position. Studs 54 are provided because under certain circumstances hinge 800 will resist rotation as a consequence of high frictional forces caused by corrosion of the hinge or other factors. This resistance to rotation coupled with the relatively small actuation force applied to barrier plate 102 by linkage assembly 20 as the barrier plate approaches the extended position may be insufficient to drive barrier plate 102 to the fully extended position.

The elements of linkage assembly 20 are designed and are coupled to barrier plate 102 and platform member 103 so as to form a four-bar linkage. The latter consists of (1) the portion of platform member 103 adjacent its outer edge 34 between the pivot axis 46 of hinge 800 and the longitudinal axis of pin 620, (2) the portion of barrier plate 102 between the pivot axis of hinge 800 and the longitudinal axis of shafts 522 and 524, (3) drag links 500, and (4) control levers 400. As noted above, the pivot axes where the four links in the four-bar linkage are attached approach coplanar alignment when barrier plate 102 is in the extended position. In fact, during the last few degrees of downward travel of barrier plate 102 pin 520 moves to an "over-center" position, with the result that the above-described four-bar linkage cannot urge barrier plate 102 to the fully extended position. By providing studs 54 adjacent drag links 500, the latter will drive barrier plate 102 downwardly through the last few degrees of travel to the fully extended position, thereby overcoming the above-noted limitation in the ability of the four-bar linkage to transmit drive forces to the barrier plate when approaching the fully extended position.

As barrier plate 102 approaches the extended position, wheels 342 begin to travel upwardly as a consequence of the inclined configuration of the slots 602 in which they are received. This upward movement drives triangular inner portion 302 of connecting links 300 upwardly in aperture 32 in platform member 103 until the fiat upper surfaces 304 of the triangular portions are approximately coplanar with upper surface 28 of the platform member. Similarly, triangular outer portions 204 of clevis links 200 are driven upwardly into aperture 32 until the fiat upper surfaces 206 of the outer portions are approximately coplanar with surface 28. When in this position, surfaces 206 and 304 together define a planar structure which fills in aperture 32 in platform member 103 such that no gaps of greater than 0.625 inch exist between elements of linkage assembly 20 or between the edges of aperture 32 and the linkage assembly. Furthermore, the upper surface of such structure is substantially coplanar with top surface 28 of platform member 103.

Furthermore, when barrier plate 102 is in the extended position, flat upper surface 402 of control levers 400, upper surface 502 of drag links 500, and the high portions of connecting links 300 on either side of concave depression 310 in the top surface of the connecting links are positioned in aperture 56 in barrier plate 120. Together, these elements define a planar structure which fills in aperture 56 in barrier plate 102 such that no gaps greater than 0.625 inch in width exist between the elements of the linkage assembly or between the edge of aperture 56 and the linkage assembly. Furthermore, the upper surface of such structure is substantially coplanar with the top surface 48 of barrier plate 102.

Concave depressions 314 are provided in the bottom surface of connecting links 300 so that when the linkage assembly is in the fully extended position the bottom surface of the connecting links will not engage projecting portions of pin 620. Concave depressions 312 are provided in the upper surface of connecting links 300 so that as the connecting links are moving outwardly and upwardly or inwardly and downwardly, the upper surface will not contact the inner edge of aperture 32 in platform member 103. Concave depressions 310 are provided in connecting links 300 to receive portions of the drag links 500 when barrier plate 102 is in the retracted position, as illustrated in FIG. 7.

Linkage assembly 20 causes barrier plate 102 to move from the extended position to the retracted position in exactly the reverse manner in which the linkage assembly deploys the barrier plate.

Clevis links 200, connecting links 300, control levers 400, and drag links 500 are designed so that when barrier plate 102 is in the extended position, no portion of these elements projects more than 0.25 inch above top surface 48 of the barrier plate and upper surface 28 of platform member 103.

For ease of description, the extended position of barrier plate 102 has been described as the position where top surface 48 of barrier plate 102 is "substantially" coplanar with upper surface 28 of platform member 103. More precisely described, however, top surface 48 extends slightly downwardly with respect to upper surface 28. Linkage assembly 20 is designed to drive barrier plate 102 to such an "over center" position so as to minimized the effort required to move a wheelchair up onto platform member 103. That is, in the extended position barrier plate 102 provides a substantially continuous surface from ground level to upper surface 28 of platform member 103.

During the travel of barrier plate 102 from the retracted position to the extended position, pin 520 positioned in oval slot 412 in control levers 400 will move from the outer end of the slot to the inner end of the slot. Then as barrier plate moves past the barrier position toward the extended position pin 420 will move within slot 412 to the outer end of the slot. Slot 412 is provided for two reasons. First, the manufacturing tolerances required to produce linkage assembly 20 are reduced by providing a slot instead of a bore. For instance, if the length of one of the elements of linkage assembly 20 is slightly longer than intended, or the placement of one of the bores in the elements is inaccurate, pin 420 is free to shift slightly within slot 412 to accommodate such manufacturing errors. Second, when barrier plate 102 is being raised from both the retracted position and the extended position, linkage assembly 20 will move independently of barrier plate 102 a small amount before it begins raising the barrier plate as pin 520 moves from one end to the other of slot 412. As a consequence of this movement of pin 520, the linkage assembly moves to a position where the mechanical advantage it provides is sufficiently great that barrier plate 102 is easily raised.

Because clevis links 200, connecting links 300, control levers 400, and drag links 500 are all made from flat plates of steel, the linkage assembly may be manufactured very inexpensively using conventional laser burning processes. When manufactured in this manner, substantially the only machining required in the fabrication of linkage assembly 20 is the drilling of the bores and slots discussed above.

Because the pins used to pivotally attach the various elements of the linkage assembly are preferably made from hardened steel, because clevis links 200, connecting links 300, control levers 400 and drag links 500 are preferably made from cadmium-coated steel plate, and because the diameter of wheels 342 is less than, e.g., 0.027 inches less than, the width of slots 602 in support plates 600, the linkage assembly will operate freely without lubrication. As a consequence, the cost of maintaining the present linkage assembly is far less than the cost of maintaining its prior art counterparts.

As a consequence of the design of linkage assembly 20, it is relatively easy to install and remove the linkage assembly 20. More specifically, by attaching the outer end of the linkage assembly to barrier plate 102 such that access to the linkage assembly is obtained via top surface 48 of the barrier plate 102, the need to remove the tread (not shown) which is typically attached to bottom surface 50 of the barrier plate 102 is avoided.

As discussed previously, the barrier cylinder 228 is attached to support plates 600*a* and 600*b* (FIGS. 2–4 and 6–9) which in turn are attached in a conventional manner to the bottom surface 30 of the outermost platform member 103. In this manner, the barrier cylinder 228 is maintained in a substantially horizontal orientation at all times, even when the step/platform assembly 24 is in the step position (FIG. 3), and there is no danger of bending forces being applied to the cylinder rod.

The barrier cylinder mounting and linkage assembly 20 described herein enable movement of the barrier plate 102 between the retracted position and the extended position while the hinged panels are in the step position. This capability enables the actuation of the barrier plate 102 to be used to latch and unlatch a stow latch mechanism for the step/platform assembly. As shown in FIG. 1, the carriage assembly 101 of the lift is provided with slides 107 and rails 108. When the hinged panels are moved from the step position to the platform position, the slides 107 slide on the rails 108 to extend the platform. Each of the rails 108 is provided with an arcuate slot 114 formed in the top of the rail 108. The slot 114 extends from the inner wall of the rail 108 to a point intermediate along the width of the rail 108. As best seen in FIG. 11, the hinge 800 that connects the barrier plate 102 to the outer edge of the outer platform member 103 is provided with a laterally extending projection 810 at each side of the hinge 800. The slides 107 comprise U-channels having endplates 116 attached in a conventional manner at the curbside end, as best seen in FIG. 1. Each of the slide endplates 116 is provided with an opening 118 to permit movement of the projections 810 past the endplates 118. When the hinged panels are in the step position, and the barrier plate 102 is moved to the retracted position, each of the projections 810 engages the corresponding one of the slots 114 in the rails 108. When the projections 810 are engaged in the slots 114, horizontal movement of the slides 107 along the rails 108 is prevented. Although in the preferred embodiment the hinge 800 is provided with a projection 810 at each end of the hinge 800 and both rails 108 are provided with slots 114, a single projection 810 and slot 114 may be used.

Simply by making movement of the barrier plate to the retracted position the last step of a lift stow operation, and movement of the barrier plate to the barrier position the first step of a lift deployment operation, normal operation of the barrier plate is used to latch and unlatch the stow latch mechanism.

The presently contemplated best mode of carrying out the present invention has been described above. Nevertheless, it should be understood that various modifications may be made to this preferred embodiment without departing from the spirit and scope of the invention.

The embodiments of the invention in which an exclusive property or privilege is claimed are defined as follows:

1. A lilt designed to be installed in an entryway of a vehicle, the lift comprising:

a platform having an upper surface, a lower surface, right and left sides, and an outer edge between the right and left sides, and being movable between a stowed position and an extended position;

a carriage assembly to which the platform is mounted, the carriage assembly comprising at least one elongate support member extending substantially parallel to the right and left sides of the platform, the support member having a top surface and an opening formed in the top surface;

a safety barrier having an upper surface, a lower surface, and right and left sides, the safety barrier being pivotally attached to the platform adjacent the outer edge of the platform so as to be rotatable about a pivot axis between (a) a first position in which the upper surface of the safety barrier confronts and is substantially parallel to the upper surface of the platform, and (b) a second position in which the safety barrier projects vertically from the platform; and a projection operatively connected to the safety barrier and extending outwardly relative to one of the right and left sides of the safety barrier;

wherein when the platform is in the stowed position and the safety barrier is in the first position, the projection engages the opening in the support member to latch the platform in the stowed position, and when the platform is in the stowed position and the safety barrier is in the second position, the projection is disengaged from the opening in the support member.

2. The lift of claim 1, wherein the safety barrier is movable also to a third position in which the safety barrier projects from the platform, and the upper surface of the safety barrier is substantially coplanar with the upper surface of the platform.

3. A lift designed to be installed in an entryway of a vehicle, the lift comprising:

a platform having an upper surface, a lower surface, right and left sides, and an outer edge, and being movable between a stowed position and an extended position;

a carriage assembly to which the platform is mounted, the carriage assembly comprising at least one support rail extending substantially parallel to the right and left sides of the platform, the support rail having a top surface and an opening formed in the top surface;

a safety barrier having an upper surface, a lower surface, and right and left sides; and a hinge having a projection extending therefrom, the hinge pivotally connecting the safety barrier to the platform adjacent the outer edge of the platform so that the safety barrier is rotatable about a pivot axis between (a) a first position in which the upper surface of the safety barrier confronts and is substantially parallel to the upper surface of the platform, and (b) a second position in which the safety barrier projects vertically from the platform;

wherein when the platform is in the stowed position and the safety barrier is in the first position, the projection on the hinge engages the opening in the support rail to latch the platform in the stowed position, and when the platform is in the stowed position and the safety barrier is in the second position, the projection on the hinge is disengaged from the opening in the support rail.

4. The lift of claim 3, wherein the safety barrier is movable also to a third position in which the safety barrier projects from the platform and the upper surface of the safety barrier is substantially coplanar with the upper surface of the platform.

5. A lift designed to be installed in an entryway of a vehicle, the lift comprising:

a plurality of hinged panels movable between (a) a platform position in which the panels define a planar platform having an tipper surface, a lower surface, and an outer edge, and (b) a step position in which the panels define a stairway, the panels including an outermost panel having an upper surface, a lower surface, and an outer edge;

a safety barrier pivotally attached at tile outer edge of the outermost panel, the safety barrier having an upper surface, a lower surface, right and left sides, and a projection extending outwardly relative to one of the right and left sides, wherein the safety barrier is pivotally attached to the outermost panel adjacent the outer edge so as to be rotatable about a pivot axis between (a)a first position in which the upper surface of the safety barrier confronts and is substantially parallel to the upper surface of the outermost panel, and (b) a second position in which the safety barrier projects vertically from the outermost panel;

a support assembly for supporting the hinged panels, the support assembly including at least one horizontal support member, the support member having an opening formed therein;

wherein when the hinged panels are in the step position and the safety barrier is in the first position, the projection engages the opening in the support member to latch the hinged panels in the step position, and when the hinged panel are in the step position and the safety barrier is in the second position, the projection is disengaged from the opening in the support member.

6. The lift of claim 5, wherein the safety barrier is movable also to a third position in which the safety barrier projects from the platform and the upper surface of the safety barrier is substantially coplanar with the upper surface of the platform.

* * * * *

UNITED STATES PATENT AND TRADEMARK OFFICE

CERTIFICATE OF CORRECTION

PATENT NO. : 5,382,130

DATED : January 17, 1995

INVENTOR(S) : Dale Kempf

It is certified that error appears in the above-indentified patent and that said Letters Patent is hereby corrected as shown below:

| COLUMN | LINE | |
|---|---|---|
| Title page, item [56] | Refs Cited | "Hinies" should read --Himes-- |
| 1 | 63 | "fight" should read --right-- |
| 3 | 48 | "pans" should read --parts-- |
| 4 | 42 | "them" should read --there-- |
| 7 | 41 | "fiat" should read --flat-- |
| 7 | 47 | "fight" should read --right-- |
| 7 | 51 | "fiat" should read --flat-- |
| 12 | 11 | "fiat" should read --flat-- |
| 12 | 15 | "fiat" should read --flat-- |
| 13 | 31 | "fiat" should read --flat-- |
| 14 (Claim 1, | 47 line 1) | "lilt" should read --lift-- |
| 16 (Claim 5, | 12 line 5) | "tipper" should read --upper-- |

UNITED STATES PATENT AND TRADEMARK OFFICE

CERTIFICATE OF CORRECTION

PATENT NO. : 5,382,130
DATED : January 17, 1995
INVENTOR(S) : Dale Kempf

It is certified that error appears in the above-indentified patent and that said Letters Patent is hereby corrected as shown below:

| Column | Line |
|---|---|
| 16 | (Claim 1, line 1) |

Signed and Sealed this

Eleventh Day of July, 1995

Attest:

BRUCE LEHMAN

Attesting Officer

Commissioner of Patents and Trademarks